3,047,555
PROCESS OF MAKING POLYMERS OF VINYL ETHERS
Gordon J. Arquette, Plainfield, N.J., assignor to Air Reduction Company, Incorporated, New York, N.Y., a corporation of New York
No Drawing. Filed May 9, 1958, Ser. No. 734,128
3 Claims. (Cl. 260—91.1)

This invention relates to polymers of vinyl lower-alkyl ethers and to a process for producing them and it is more particularly concerned with a process for making high molecular weight amorphous poly(vinyl lower alkyl ethers), especially poly(vinyl methyl ethers), which have valuable properties.

The polymerization of vinyl alkyl ethers has been heretofore proposed and various processes have been described. Typical processes have, for example, been disclosed in U.S. 2,104,000 and U.S. 2,104,002 wherein polymerization is effected in the presence of acid-reacting catalysts at various temperatures. The products obtained by these prior processes are for the most part brown, viscous, liquid or soft-solid products, generally described as "balsam-like." In any case, they are of relatively low molecular weight. Efforts to produce more valuable products have continued and products have been described which have a higher molecular weight and are further removed from the liquid or soft-solid state. These improved products, however, have only moderately good physical properties and their molecular weights are far below those which are obtained in polymers of other types of monomers, such as styrene.

There has, accordingly, been a continuing search for vinyl alkyl polymers of truly high molecular weight and particularly for polymers which exhibit valuable related properties such as high intrinsic viscosity and good elongation characteristics. Varying success has been had with the several members of the vinyl alkyl ether family but particular difficulty has been experienced when working with vinyl methyl ether which has been found to have the least activity of all and to exhibit limited response to the usual polymerization processes. Various catalysts have been proposed but heretofore used catalysts have produced relatively low molecular weight polymers of vinyl methyl ether. Furthermore, very low temperatures have generally been necessary for controlled polymerization initiated by prior catalysts, and attempts to operate at temperatures in the vicinity of 0° C. or room temperature have been difficult to control due to the exothermic nature of the reaction.

It is an object of the present invention to provide new amorphous polymers of vinyl lower alkyl ether which have high molecular weights and valuable physical properties, more particularly amorphous vinyl methyl ether polymers which have these characteristics.

It is another object of the invention to provide a process for producing amorphous vinyl lower alkyl ether polymers of the character indicated which is particularly suitable for the polymerization of vinyl methyl ether.

It is a further object of the invention to provide a new catalyst for polymerizing vinyl lower alkyl ethers which is of particular utility in forming high molecular weight amorphous polymers from vinyl methyl ether.

The amorphous high molecular weight polymers of this invention are suitably prepared by polymerizing a vinyl lower alkyl ether, more specifically vinyl methyl ether ($CH_2=CH-O-CH_3$), at temperatures between $-50°$ C. and 90° C., preferably at temperatures of 0–25° C., using a catalyst obtained by combining a boron trifluoride ether complex or "adduct" with a chlorinated methane containing at least one hydrogen atom viz. chloroform, methyl chloride and methylene chloride, which will hereinafter be referred to as a "hydrochloromethane." Polymerization is effectively carried out without the use of solvents and the reaction is thus one of "bulk polymerization." Inert solvents, such as pentane and benzene, may however be used, if desired. One of the valuable characteristics of the catalyst which I employ is its almost immediate action upon the monomer to effect polymerization to a high molecular weight, clear, colorless polymer.

To prepare the catalyst, before it is brought into contact with the monomer, the boron trifluoride-ether complex is mixed with the hydrochloromethane, e.g. chloroform, at room temperature and then allowed to stand for a short time, e.g. 1 to 10 minutes. While the boron trifluoride-diethyl ether complex is preferably used, other boron trifluoride complexes may be used such as the following boron trifluoride ether complexes: boron trifluoride-dimethyl ether, boron trifluoride-methylethyl ether, boron trifluoride-methylpropyl ether, boron trifluoride-ethylisopropyl ether, boron trifluoride-dipropyl ether, and the like.

The ratio between the chloroform and the boron trifluoride-ether employed in preparing the catalyst may vary to a considerable extent but preferably about 50 parts by volume of hydrochloromethane are used per part of boron trifluoride-ether complex. In general, 1 to 500 parts by volume of hydrochloromethane per part of the complex are suitably used.

To effect polymerization, the hydrochloromethane boron trifluoride-ether is merely added to the monomer, e.g. vinyl methyl ether. After a short induction period, e.g. 2 minutes or less, polymerization starts, as evidenced by rapid evolution of heat and the reaction is generally complete within a period of ½ to 3 hours. Completion of the reaction is evidenced by high viscosity of the reaction mixture or by lack of heat evolution.

If an inert solvent or diluent for the vinyl alkyl ether is used, it is suitably a liquid hydrocarbon, e.g. an aliphatic or aromatic hydrocarbon such as liquid butane, pentane, hexane, benzene, toluene, xylenes, and the like. The entire reaction is readily carried out at atmospheric pressure, and there is no need to employ super-atmospheric or sub-atmospheric pressures, although such pressures may be used if desired, particularly if the boiling point of any solvent should make it advantageous.

The polymerization mixture suitably contains 10 to 100 mole percent of the monomeric vinyl alkyl ether and the quantity of catalyst is advantageously .1% to 10%, preferably about 1.5%, by weight of the vinyl alkyl ether monomer. When an inert solvent or diluent, e.g. pentane, is used, it is advantageously employed in the amount of 0.5 to 3 parts by weight per part of monomer.

Commercial vinyl alkyl ethers are commonly produced by the reaction of acetylene upon the appropriate alcohol and commercial vinyl methyl ether, for example, normally contains a total of about 5% of contaminants consisting of methanol, water, acetaldehyde, acetylene, and possibly dimethyl acetal. One of the important advantages of the catalyst of this invention is its ability to form valuable clear, colorless polymers. Commercial monomer can be polymerized with the novel catalyst without preliminary purification although it is generally desirable first to wash the monomer thoroughly with water to remove the methanol or other alcohol, followed by drying over KOH and recovery of the monomer by distillatin. If, however, it is desired to reduced to a minimum the various contaminants present, this can be done by refluxing the commercial monomer over solid potassium hydroxide, e.g. at 6° V., for about 16 hours, followed by refluxing over metallic sodium for about 16 hours. The ether is separated from the potassium by simple distillation and, following the treatment over metallic sodium, the ether is distilled through a fractionating column until the distillate gives a negative test for acetylene (Ilosvay's reagent) and acetaldehyde (Tollen's reagent).

The polymerization reaction is conveniently carried out in any conventional apparatus used for this type of reaction. When operating on a small scale, for example, a particularly suitable reaction vessel is a three-necked flask fitted with a "Dry-Ice" condenser and suitably provided with a thermometer. Corresponding large-scale units are readily employed when desired and the process of the invention is in no way limited by a particular reaction apparatus.

Upon completion of polymerization, the catalyst is deactivated or "quenched" prior to separation of the polymer. The quenching of acid-reacting catalysts is a well-known procedure and is suitably effected by treating the polymerization mass with a mixture of equal amounts of methanol and ammonium hydroxide containing a small amount, e.g. 1%, of thymol or other oxidation inhibitor. Instead of ammonium hydroxide, other alkaline reagents such as sodium hydroxide, potassium hydroxide or organic amines such as methylamine, ethanolamine, pyridine, and the like may be used, and instead of methanol, other alcohols such as ethanol and butanol, and the like may be employed. For each volume of the polymerization mass there are advantageously employed .05 to 1 volumes of the quenching mixture.

After deactivation or "quenching" of the catalyst, the polymer is recovered merely by evaporation of the alkaline solvent. The polymer is then dried, preferably under vacuum, in a low temperature oven, e.g. at 30 to 50° C. to constant weight.

The polymers produced in accordance with this invention are characterized by a molecular weight of at least 10,000, preferably 40,000 to 330,000, and an intrinsic viscosity of at least .2 deciliter per gram (dl./gm.), preferably 0.4 to 1.3 dl./gm. The several properties of the polymers referred to above are determined in suitable manner by conventional methods. Thus, molecular weight is suitably determined by the well-known light-scattering method described, for example, on pages 283–303 of "Principles of Polymer Chemistry," by Paul J. Flory (Cornell University Press, 1953). Intrinsic viscosity is similarly determined by conventional techniques in accordance with the procedure described on pages 309–314 of Flory's "Principles of Polymer Chemistry," identified above, using an Ubbelohde (suspended level) viscometer for methyl ethyl ketone solutions at 30° C.

I have found that the relationship which exists between intrinsic viscosity and molecular weight may be expressed by the following formula: $[\eta]=1.1\times 10^{-3}M^{0.56}$, wherein $[\eta]$ is the intrinsic viscosity in deciliters per gram and M is the molecular weight. It is possible by means of this formula to determine molecular weight with accuracy once the intrinsic viscosity value is known.

The amorphous poly(vinyl alkyl polymers), particularly the polyvinyl methyl ethers, obtainable in accordance with the above-described process are novel compositions of matter characterized not only by the high molecular weight and the other valuable properties heretofore defined, but they are also characterized by the fact that they are clear and colorless and have long-lasting stability to light and heat. They have improved form stability and they can be cross-linked by treatment with benzoyl peroxide, which has the effect of rendering the polymer thermo-setting. The polymers are generally soluble in organic solvents such as benzene, chlorobenzene, ether, octane, ethanol and with respect to water they are generally insoluble, except that the vinyl methyl ether polymer is soluble in water below 35° C.

A particularly important and valuable use for the high-molecular weight polymers of this invention is as the fuel component of solid rock propellants, wherein they are admixed with an oxidizer such as sodium nitrate, ammonium perchlorate, and like known solid propellant oxidizers. Thus, in a typical solid rocket propellant having a high specific impulse, e.g. a specific impulse of 240 pounds per second per pound, a high molecular weight amorphous polymer having the characteristics above described is combined with the oxidizer in the proportions of 20% by weight of polymer and 80% by weight of oxidizer. The polymer may be used as the sole fuel component of the propellant or it may be combined with the high molecular weight crystalline poly(vinyl alkyl ethers) described in the copending application of Gordon J. Arquette and Julius G. Shukys, entitled "Vinyl Ether Polymers and Process of Making Same," and filed on even date herewith. A mixture of the amorphous polymer of this invention, e.g. 90% with e.g. 10% by weight of a crystalline polymer produced by the process described in said copending application has been found to be suitable. The polymers of vinyl methyl ether are particularly effective for this rocket propellant use.

The following specific examples are further illustrative of the invention it being understood that these examples are given by way of illustration only and are not to be considered as limitative of the invention. Unless otherwise specified, all parts are by volume.

*Example 1*

A catalyst in accordance with this invention was prepared by combining 1 part of boron trifluoride-ethyl ether complex with 50 parts of chloroform. These two compounds were mixed together in the proportions indicated and allowed to stand for 10 minutes. Into a polymerization flask containing 133 parts of vinyl methyl ether, which had been treated as described above by refluxing for 16 hours over solid potassium hydroxide followed by refluxing for 16 hours over metallic sodium, there was added 1 part of the above-described catalyst. The flask was provided with a "Dry-Ice" condenser and with a thermometer and prior to addition of the catalyst it was packed in wet ice. A short time after the addition of the catalyst, reaction began with rapid reflux from the condenser. After about only three minutes, the reaction became less vigorous, leaving a colorless liquid. This liquid continued to thicken as the reaction proceeded and was complete after about 2 hours, after which the reaction mixture was quenched and the polymer recovered. Quenching was effected with a mixture of equal parts of methanol and ammonium hydroxide, the quenching mixture being used in the quantity of 0.2 volume per volume of polymerization mass. Following separation of the quenching mixture, the polymer was dried to constant weight in an oven at 40° C. under vacuum.

There was thus recovered from the reaction mixture in 75% yield a clear, colorless, non-tacky poly(vinyl methyl ether) having an intrinsic viscosity (dl./gm.) of 0.8 and a molecular weight of 150,000.

*Example 2*

The procedure of Example 1 was repeated, using the same quantities of materials in the same manner except that the quenching mixture contained no aqueous ammonia and consisted solely of methanol containing 1% of thymol. The yield of polymer correspond to that of Example 1 and the clear, colorless, non-tacky polyvinyl methyl ether was found to have an intrinsic viscosity of 0.8 dl./gm. and had a molecular weight of 150,000.

*Example 3*

The procedure of Example 1 was again repeated except that the vinyl methyl ether monomer used, instead of having been treated in the manner described above to remove contaminants was merely washed with iced water twice, dried over KOH and distilled with slight fractionation. After treating this monomer exactly as described in Example 1, there was recovered in 85% yield a clear, colorless, non-tacky polyvinyl methyl ether having an intrinsic viscosity (dl./gm.) of 0.65 and a molecular weight of 100,000.

*Example 4*

Again the procedure of Example 1 was followed with the quantities and reagents therein specified except that the monomer of Example 3 was used and the 1 part of catalyst was added in four increments of ¼ part spaced apart by 3 minutes. This had the effect of reducing the intensity of the initial reaction so that less rapid reflux occurred. After quenching and recovery as described in Example 1, the clear, colorless, non-tacky poly(vinyl methyl ether) which was obtained in a yield corresponding to Example 3 had an intrinsic viscosity of 0.58 dl./gm. and a molecular weight of 80,000.

*Example 5*

150 parts of the monomer of Example 1 had added to it 5 parts of chloroform and 1 part of the catalyst of Example 1 which was added in ¼ part increments as in Example 4. The reaction ran smoothly and required 2 hours for its completion. After quenching and polymer recovery as described in Example 1, a clear, colorless, non-tacky poly(vinyl methyl ether) was obtained in about 80% yield. This polymer was found to have an intrinsic viscosity (dl./gm.) of 0.65 and had a molecular weight of 100,000.

*Example 6*

One part of the catalyst described in Example 1 was diluted with four parts of chloroform and four portions of 1¼ parts each of the resulting mixture were added at 3 minute intervals to 133 parts of vinyl methyl ether contained in a polymerization flask provided with a "Dry-Ice" condenser. The reaction proceeded smoothly and was complete in two hours. Following the procedure described in Example 1, the polymerization mass was quenched and the product recovered in about 80% yield. The clear, colorless, non-tacky poly(vinyl methyl ether) thus obtained had an intrinsic viscosity of 0.59 dl./gm. and a molecular weight of 80,000.

*Example 7*

A catalyst was prepared by combining 1 part of boron trifluoride-ethyl ether complex with 200 parts of methyl chloride. As in the case of the catalyst described in Example 1, these two compounds were mixed together in the proportions indicated and allowed to stand for 10 minutes. Following the procedure of Example 1, about 1 part of the catalyst was added dropwise to 133 parts of vinyl methyl ether at 6° C. and the produced polymer was subsequently recovered after the polymerization mass had been quenched. The poly(vinyl methyl ether) thus obtained was similar to the product described in the preceding examples and had an intrinsic viscosity of about 0.5.

In the foregoing examples, the polymerization of vinyl methyl ether has been described in detail and, as previously indicated, the process of this invention is of particular value for the polymerization of this monomer and makes possible the production of new poly(vinyl methyl ethers) which have new properties. However, the process is also applicable to the polymerization of other vinyl lower alkyl ethers, e.g. vinyl ethers having alkyl groups containing up to four carbon atoms, such as ethyl, propyl and butyl. The following examples show the application of this process to representative members of these other vinyl alkyl ethers.

*Example 8*

In a flask provided with a water condenser, there were mixed 317 parts of pentane, 130 parts of vinyl ethyl ether and 0.8 part of the boron trifluoride-ethyl ether-chloroform catalyst described in Example 1, the catalyst being added in two 0.4 part increments spaced 15 minutes apart. After addition of the second increment, reaction became apparent because the temperature rose from room temperature to 34° C. After four hours the polymerization mixture was quenched and the polymer recovered in the manner described in Example 1, except that the quenching mixture comprised equal parts of pentane and ammonia. The poly(vinyl ethyl ether) thus recovered was clear and colorless with an intrinsic viscosity (dl./gm.) of 0.39.

*Example 9*

The procedure of Example 8 was followed except that 130 parts of vinyl isopropyl ether were used instead of vinyl ethyl ether, and only 0.4 part of catalyst was used and this was added in a single increment. The clear, colorless polyvinyl isopropyl ether was found to have an intrinsic viscosity of 0.828 dl./gm.

The amorphous poly(vinyl lower-alkyl ethers) which are obtained in accordance with our above-described process, as shown in the foregoing examples, are, as previously mentioned, particularly suitable as the fuel component of a solid rocket propellant. Thus when the polymer of Example 3, for instance, is combined with ammonium perchlorate or other like solid oxidizer in the proportions of 70 to 90% by weight of oxidizer to about 30 to 10% by weight of the polymer, e.g. 80% by weight of ammonium perchlorate and 20% by weight of amorphous poly(vinyl methyl ether), there is provided a particularly effective solid rocket propellant having a high specific impulse, e.g. about 240 seconds, which is defined as the amount of thrust in pounds that can be obtained from each pound of propellant consumed per second.

It will be understood that various changes and modifications may be made in the subject matter described above and shown without departing from the invention as defined in the appended claims, and it is intended, therefore, that all matter contained in the foregoing description, shall be interpreted as illustrative only and not as limitative of the invention.

I claim:

1. A process for making high molecular weight polymers of a vinyl lower alkyl ether wherein said lower alkyl radical contains from 1 to 4 carbon atoms, which comprises combining one part of boron trifluoride-ether complex with 1 to 500 parts of a chlorinated methane and allowing the reaction mixture to stand for at least one minute, thereby forming a polymerization catalyst, adding said catalyst to a vinyl lower alkyl ether monomer in the amount of 0.1 to 10% by weight of catalyst based on the weight of monomer, and polymerizing said vinyl lower alkyl ether in admixture with said catalyst at a temperature of −50 to 90° C.

2. A process according to claim 1 wherein said vinyl lower alkyl ether is vinyl methyl ether.

3. A process according to claim 1 wherein said polymerization is carried out at a temperature of about 0 to 25° C.

References Cited in the file of this patent

UNITED STATES PATENTS

| | | |
|---|---|---|
| 2,555,179 | Zoss | May 29, 1951 |
| 2,616,879 | Zoss | Nov. 4, 1952 |

OTHER REFERENCES

Schildknecht et al.: "Ind. and Eng. Chem." 41, #9, pp. 1998–2003, September 1949. (Copy in Sci. Lib.).